United States Patent [19]

Navarette

[11] Patent Number: 4,608,912
[45] Date of Patent: Sep. 2, 1986

[54] LINEAR HYDRAULIC ACTUATOR HAVING BALLISTIC TOLERANT

[75] Inventor: Carlos A. Navarette, Canoga Park, Calif.

[73] Assignee: Allied Corporation, Morristown, N.J.

[21] Appl. No.: 668,064

[22] Filed: Nov. 5, 1984

[51] Int. Cl.$^4$ ............... F01B 1/00; F16J 11/04
[52] U.S. Cl. .................. 92/5 R; 92/169; 92/170; 89/36.02
[58] Field of Search ........... 92/161, 169, 170, 171; 91/361; 89/36.01, 36.02, 36.04, 36.15; 251/62

[56] References Cited

U.S. PATENT DOCUMENTS

| | | | |
|---|---|---|---|
| 3,403,365 | 9/1968 | Richards | 92/5 R |
| 3,443,594 | 5/1969 | Frayer | 91/361 |
| 3,654,549 | 4/1972 | Maurer et al. | 92/5 R |
| 3,738,232 | 6/1973 | Kado | 92/161 |
| 3,884,127 | 5/1975 | Simmons | 92/151 |
| 4,211,151 | 7/1980 | Wallischeck | 92/146 |
| 4,300,439 | 11/1981 | Degnan et al. | 92/171 |
| 4,449,446 | 5/1984 | Degnan et al. | 92/170 |

Primary Examiner—G. L. Walton
Attorney, Agent, or Firm—Robert C. Smith; Vett Parsigian

[57] ABSTRACT

A ballistic tolerant linear actuator incorporates a piston (16, 46, 76) and piston rod (38, 42 or 48, 50 or 90, 92) within a cylindrical housing (58, 60 or 81, 88) connected at each end (14, 22 or 42, 54 or 74, 82) to a source of fluid. A sleeve (18, 62 or 88) of a metal matrix or composite material which will break or puncture but which will not bend or petal on impact is incorporated as part of the barrel within which the piston is translated. The piston rod which extends through at least one end of the cylindrical housing is formed with an external sleeve of the metal matrix or composite material (38, 50 or 92) spaced from an internal load carrying metal rod (42, 48 or 96). A plurality of such actuators are connected together in a redundant arrangement such that when a projectile strikes an actuator, it may puncture the housing (58, 60 or 81), causing a loss of hydraulic fluid, it may puncture the sleeves (18, 62 or 88), but these sleeves do not deform in such a way as to prevent the piston (16, 46, 76) from travelling in the sleeve (18, 62 or 88) or the rod (38, 50 or 92) from passing through the end of the cylinder.

9 Claims, 4 Drawing Figures

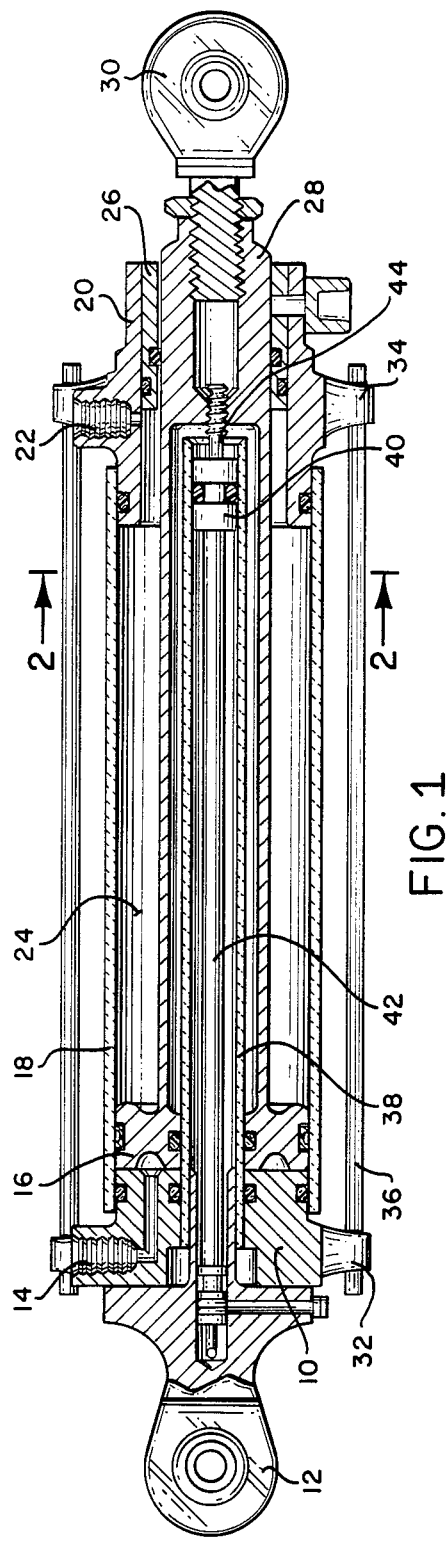

LINEAR HYDRAULIC ACTUATOR HAVING BALLISTIC TOLERANT

This invention relates to linear hydraulic actuators and more particularly to hydraulic actuators having ballistic tolerant properties.

A usual type of linear hydraulic actuator consists of a cylinder having fluid passages at each end connected to a source of fluid under pressure, a piston in the cylinder which moves toward one end of the cylinder or the other depending upon the fluid pressure differential across it, and an actuating rod connected to the piston and which passes through at least one end of the cylinder for driving some member such as a control surface of an aircraft or ship.

In recent years several types of aircraft, and particularly, certain types of helicopters have been used in connection with infantry actions such that they are subjected to fire from small arms and projectiles up to 50 caliber or more. Such fire will normally disable an actuator by jamming the rod or piston and/or puncturing the cylinder and causing loss of hydraulic fluid. It has become common practice to use a plurality of actuators in tandem or otherwise connected together through a linkage to provide redundancy so that the loss of a single actuator will not cause loss of control. The purpose of providing redundant actuators is frustrated, however, if the damaged actuator becomes jammed so that the remaining actuator cannot move the output rod. This can happen when the cylinder is punctured so that the metal deforms inwardly, forming a series of irregular metal points projecting into the cylinder (referred to as petalling) which block passage of the piston. One approach which has been taken to this problem is to incorporate a piston which has break-away sectors such that when the piston and rod are pulled by another actuator and the piston is pulled into the petalled deformations, portions of the piston will break away, permitting the rod to move as before. There is some difficulty in consistently producing pistons which have the desired predictable break away characteristics. There are some kinds of damage which may be so severe or have so much blocking material that the piston still may not break away sufficiently to clear the obstacles. For these reasons applicant has chosen to explore other approaches to the problem.

One design which has proved effective is to modify the construction of the actuator to avoid petalling of the parts adjacent movable parts. Specifically, the actuator of the present invention incorporates a sleeve within which the piston is translated formed of a composite material which does not petal when struck by a projectile. Such material may be a metal matrix such as aluminum containing silicon carbide which is quite strong, yet brittle such that, when struck, it breaks somewhat like glass, but does not bend. Another useful material for such a sleeve consists of a cylinder of wound graphite fibers held together with a plastic adhesive such as an epoxy resin. The sleeve is then plated according to a known process with metal such as extremely thin layers of nickel and chromium, which plating layer forms a hard surface against which the piston moves. This plating process is described in U.S. Pat. No. 4,422,907. This composite sleeve has been found to be fully capable of carrying the hydraulic pressure load which essentially becomes a tension load on the fibers since other structure is relied upon to carry the axial load on the actuator. A similar composite is formed as the external surface of the rod, which is plated on the outside to form an opposing surface to pass through the cylindrical opening on the end of the actuator. Wherever applicant refers to composite material herein, it is intended to include any of the above described non-petalling materials such as the metal matrix or the wound graphite sleeve construction. The tensile load carrying member of the rod is an internal rod of metal within the sleeve so that there is an appreciable space between the sleeve and the internal rod.

With an actuator formed as described above, a projectile may penetrate an external barrel which does petal to a degree but this petalling only extends into a chamber which forms a space between the external barrel and the sleeve within which the piston moves. Further penetration of the projectile will punch through the sleeve causing it to break, but not petal, as in the case of the metal matrix material described above, or it may simply punch through the epoxy cement and graphite fibers, which do not form a petal deformation so that movement of the piston is not inhibited. Similarly, further penetration will cause breakage or punching through of the external sleeve on the rod member which also does not result in petal deformation so that the rod will continue to pass through the end of the cylinder as before. Even some bending of the internal rod does not result in jamming of the actuator since the rod is smaller in diameter than the opening through which it passes. Thus the construction described will enable the actuator to be severely damaged to the point of losing hydraulic fluid and pressure and still it does not become jammed such that it blocks the operation of a redundant actuator.

The invention will now be described with reference to the accompanying drawings wherein:

FIG. 1 is a sectional view of one embodiment of my invention;

FIG. 2 is a cross section taken along line A—A of FIG. 1;

FIG. 3 is a partial cross section of another embodiment of my invention; and

Figure 4:
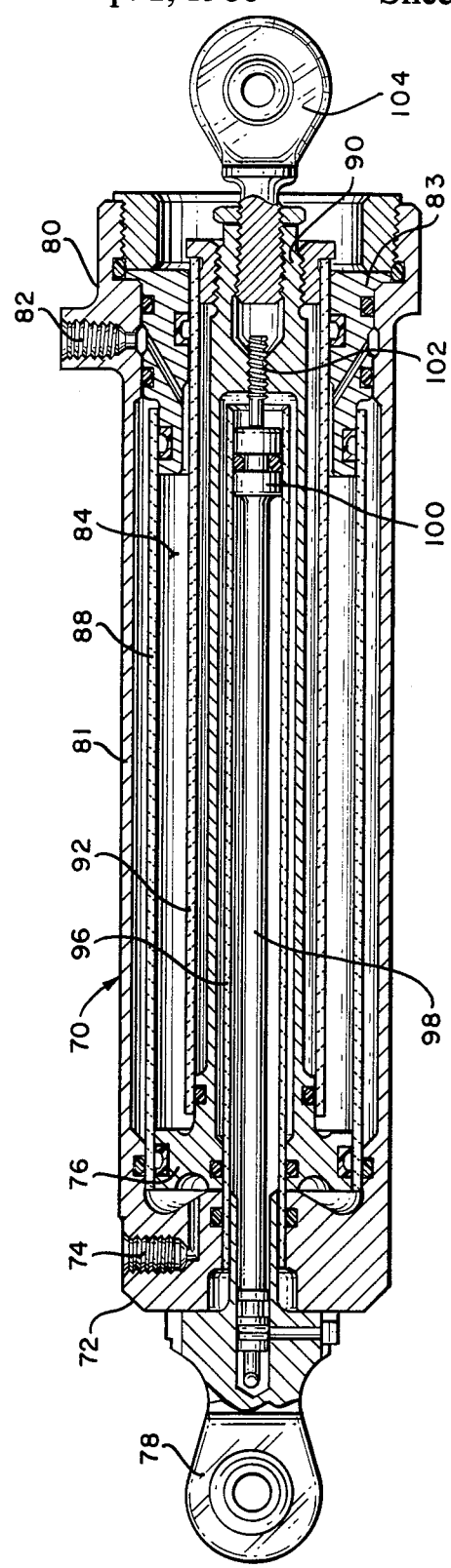
FIG. 4 is a sectional view of a further embodiment of my invention.

Referring now to FIG. 1 the actuator is shown including a head end member 10 including a clevis 12 for attachment to a fixed member. Head end member includes a fluid inlet port 14 which admits fluid pressure to be exerted against the head of a piston 16. Piston 16 is translatable within a cylindrical barrel member 18 extending between head member 10 and a rod end support member 20 which contains a fluid port 22 permitting ingress and egress of fluid from the internal chamber 24 communicating with the backside of piston 16. Member 20 includes a large cylindrical opening 26 which carries the piston rod member 28. A rod end member 30 is threaddedly engaged with rod 28 for attachment to further linkage means driving an actuator or other desired member. Rod 28 is connected to one side of piston 60 and incorporates a metal cylindrical member having substantial tensile strength for carrying axial loads.

Cylinder barrel member 18 is formed of a composite material having substantial strength for resisting internal fluid pressure but does not carry the axial load on the actutor. Attached to head member 10 and rod end support member 20 are bosses 32 and 34, respectively, which support a tension rod 36 which, in combination with other similar tension rods (See FIG. 2) carry the axial load on the actuator. Barrel member 18, being formed of either a metal composite or the plated graphite and epoxy matrix as described above, will not petal if impacted by a projectile but will simply permit the projectle to punch through thereby avoiding any deformation which would inhibit the travel of piston 16.

Fastened within the head member 10 is another elongated composite cylindrical member 38 which surrounds and supports a linear variable displacement transformer including a stator 40 carried on a rod 42 which cooperates with an armature member 44 movable with rod 28 to provide position feedback signal to a control system controlling the operation of the actutor. The composite cylindrical member 38 which is anchored at head member 10 is plated on its outside surface because piston 16 travels over this surface as it moves in either direction. Member 38 is of composite material since if it were to be significantly deformed it could inhibit movement of piston 16 and if it were to petal inwardly a sufficient amount, it could result in deforming the hollow rod 42 within which the extension of armature 44 moves and cause interference between members 42 and 44.

FIG. 2 is a cross section taken through line 2—2 of FIG. 1. In this view is shown tension rod 36 and boss 32 which forms part of the head member 10. Carried within member 18 is shown piston 16 which is attached to rod 28. Carried within rod 28 is the composite sleeve member 38 which, in turn, contains a hollow rod 42 which supports the movable armature member 44. For simplicity, only one tension member 36 and boss 32 are shown in FIG. 1. Four such bosses are shown in FIG. 2 with their corresponding tension rods. This number could be subject to some variation such that in some applications three tension rods would be adequate, in other cases it might be preferred to use five. These members are spaced in such a way that it is unlikely that they will be deformed from an incoming projectile sufficiently to interfere with the passage of piston 16 and rod 28. Since sleeve 18 is not subject to a petalling deformation, piston 16 and rod 28 will still be movable despite a loss of fluid from chamber 24.

A somewhat modified form of my invention is shown in FIG. 3 which is a cross section of the top half of an actuator shown generally at numeral 39 having similar ballistic tolerant properties. In this embodiment a fragmentary part of a head end member is shown at numeral 40 including a fluid passage 42 which carries hydraulic fluid to a chamber 44 adjacent the head of a piston 46. Attached to the piston 46 is a rod consisting of a metal cylindrical internal member 48 surrounded by a composite sleeve 50 carried on upstanding ridges of member 48 in such manner as to create a significant space between members 48 and 50. Member 50 is plated on its exterior surface so that it may pass through the end member 52 of the cylindrical actuator 39. Located within end member 52 is a fluid passage 54 for carrying operating fluid to a chamber 56 on the right side of piston 46. Extending between end members 40 and 52 is a generally cylindrical barrel consisting of a metal cylindrical member 58 which carries the axial load on the actuator and which is wrapped with a filament such as a filament of aramid fiber impregnated with an epoxy resin. It's function of this filament wrap 60 to provide a layer which will deflect relatively slow-moving or spent projectiles. Also carried between end members 40 and 52 and spaced internally from member 58 is a composite sleeve 62 which, has a metal plated internal surface against which the piston 46 moves.

The actuator structure described provides ballistic protection first from slow-moving or relatively spent projectiles which may be deflected by the layers 60 without penetrating or significantly deforming the axial load bearing member 58. High velocity projectiles which will penetrate layer 60 and member 58 will in fact cause petalling deformation of member 58 but this deformation, in all probability, will not penetrate far enough to reach the composite sleeve 62. Should the projectile penetrate sleeve 62, it will simply punch through and will not cause petalling deformation of this layer. Therefore, the piston 46 will continue to be movable along the surface of member 62 even though the actuating fluid may be lost. Should the projectile continue further within the actuator entering chamber 56 and striking the cylindrical rod member 50, this member will also permit the projectile to simply punch through without causing a petalling deformation and therefore the rod member 50 will pass the internal passageway of end member 52 without interference from such damage. Even such a hit as will significantly deform member 48 will be unlikely to cause such deformation as to prevent members 48 and 50 from clearing the internal passageway of end member 52. It will thus be seen that a projectile could penetrate at several different levels within the actuator shown and, although the actuator itself is effectively put out of commission, the movement of the piston 46 and the rod members 48 and 50 will not be inhibited due to such damage.

Another embodiment of my invention is shown in FIG. 4. The actuator shown generally at numeral 70 includes a metal barrel incorporating a stationary head section 72 including a fluid passageway 74 for permitting hydraulic fluid to flow to a chamber adjacent the head of piston 76, a rod end section 80 and a cylindrical portion 81 extending between said head and rod end sections. Also attached to head section 72 is a clevis 78 for fastening the actuator to a stationary structural member. At the rod end of the actuator is a rod end member 83 which is threadedly engaged with rod end section 80. A fluid inlet passage 82 is formed in rod end section 80 for permitting operating fluid to flow into a chamber 84 where it exerts pressure against the right side of piston 76. Cylindrical portion 81, which carries the axial load on the actuator member, may be formed together with end sections 72 and/or 80, or as a separate piece, and is of a strong metal material which will petal on impact. Spaced concentrically inwardly from cylindrical portion 81 is a composite sleeve 88 which has a hard metal plate on its inner surface since this is a wearing surface against which piston 76 moves. Carried on a shoulder at each end of a rod member 90 is a composite sleeve member 92 which has its external surface hard plated such that it may pass through the internal passage in the rod end member 83. The rod member 90 which is spaced internally from composite member 92 carries the axial load and this member may be formed either integrally or as a separate piece fastened to piston 76. Piston 76 has a hollow interior passageway which rides on a composite sleeve 96 plated on its exterior surface to provide a wear surface for the passage of said piston. Sleeve 96 is fixed to the head end section 72 and contains a hollow tubular member 98 which terminates in a larger diameter end portion 100. Attached to the piston rod 90 and projecting within the hollow interior of tubular member 98 is a slide 102 which forms part of the linear variable differential transformer and which cooperates with member 100, which is an electrical coil or stator, to provide feedback signals representative of the position of rod 90. Attached to the rod 90 is a rod end member 104 for attachment to a linkage structure or rod connected to a control surface or other member to be operated by the actuator. As previously stated, it is expected that actuators such as those described above will be connected either in tandem or together in a linkage system to provide redundant drive means so that in the event one actuator is disabled another actuator can continue to perform the desired function.

A projectile striking actuator 70 along cylindrical portion 81 will, in all probability, cause inward denting or penetration with petalling of this member. Such deformation will extend inwardly part of the distance between cylindrical portion 81 and composite sleeve 88 but should not exceed this distance. Such limited deformation, without more, would not affect operation of the actuator in any significant respect. Further penetration would result in the projectile punching through sleeve 88 which would result in loss of hydraulic fluid, disabling the actuator, but since composite sleeve 88 will not bend or petal, piston 76 will move readily. Still further penetration could cause punching through sleeve 92 which passes through rod end member 83 but since sleeve 92 is of composite material, it does not petal or bend in such way as to be blocked. Yet further penetration can cause penetration of sleeve 96 upon which piston 76 rides, but this sleeve also does not produce petal deformation when penetrated. Consequently, penetration of sleeve 96 will not result in creating an interference or jamming with tubular member 98 which could cause member 102 to be jammed inside of member 98. The LVDT structure can be built sufficiently light in weight that a redundant actuator would be able to pull piston 76 even if members 98 and 102 are jammed together.

Those skilled in the art will be able to visualize many different configurations of linear actuators for which the present invention can be useful and I do not want to be limited other than by the scope of the appended claims.

I claim:

1. A linear hydraulic actuator having ballistic tolerant properties connected to a source of fluid under pressure including a cylinder having a barrel portion and first and second end portions, a piston in said cylinder, a rod movable in said cylinder carrying said piston and passing through at least one of said end portions, and fluid conduit means connected to said cylinder on opposite sides of said piston;

characterized in that at least a part of said barrel portion is a cylindrical sleeve formed of a composite material which contains said fluid under pressure and which does not petal on impact, said composite material being radially spaced from said rod and plated on its internal surface with a hard coating to permit repeated translation of said piston thereagainst, and strong metal means spaced radially a significant distance from said cylindrical sleeve is provided extending between said end portions for carrying the axial loads on said barrel such that a ballistic impact on said strong metal means does not necessarily result in damage to said composite cylindrical sleeve.

2. A hydraulic actuator as claimed in claim 1 wherein said rod encloses a chamber and a linear variable displacement transformer is carried in said chamber including a stationary tubular member of frangible material attached to one of said end portions and a slide member including a coil which is carried with said rod and movable within said frangible tubular member.

3. A hydraulic actuator as claimed in claim 1 wherein said strong metal means includes a plurality of tie rods extending between said first and second end portions.

4. A hydraulic actuator as claimed in claim 1 wherein said strong metal means includes a generally cylindrical member coaxially surrounding and radially spaced from said cylindrical sleeve and fastened to said end portions.

5. A hydraulic actuator as claimed in claim 1 wherein said rod includes a small diameter tubular load bearing section and a coaxially positioned sleeve of said composite material surrounding said load bearing section and radially spaced therefrom, said sleeve being plated on its external surface with a hard coating to permit translation of said rod through said end portion.

6. A hydraulic actuator as claimed in claim 5 wherein said generally cylindrical member has an external wrap of high tensile strength filaments held in place by adhesive means.

7. A hydraulic actuator connected to a source of fluid under pressure including a cylinder having a barrel portion and first and second end portions, a piston in said cylinder, a rod movable in said cylinder carrying said piston and passing through at least one of said end portions, and fluid conduit means connected to said cylinder on opposite sides of said piston;

characterized in that said rod has a small diameter tubular load bearing section and a coaxial sleeve of a composite material which does not petal on impact surrounding and spaced from said load bearing section, said sleeve being plated on its external surface with a hard coating to permit translation of said rod through said end portion, and said barrel portion includes a second coaxial sleeve of said composite material spaced radially outwardly from said first sleeve and plated on its internal surface with a hard coating to provide an opposing surface for said piston, and a strong metal sleeve surrounding and spaced from said second coaxial sleeve, said second coaxial sleeve and said strong metal sleeve both being supported by said end portions such that a ballistic impact on said strong metal sleeve does not necessarily result in damage to said second coaxial sleeve.

8. A hydraulic actuator as claimed in claim 7 wherein said rod encloses a chamber and a linear variable displacement transformer is carried in said chamber including a stationary tubular member of frangible material attached to one of said end portions and a slide member including a coil which is carried with said rod and movable within said frangible tubular member.

9. A hydraulic actuator as claimed in claim 7 wherein said generally cylindrical member has an external wrap of high tensile strength filaments held in place by adhesive means.

* * * * *